July 3, 1962 N. L. GROSTICK 3,042,767
MOTION INDICATOR
Filed July 14, 1958 2 Sheets-Sheet 1
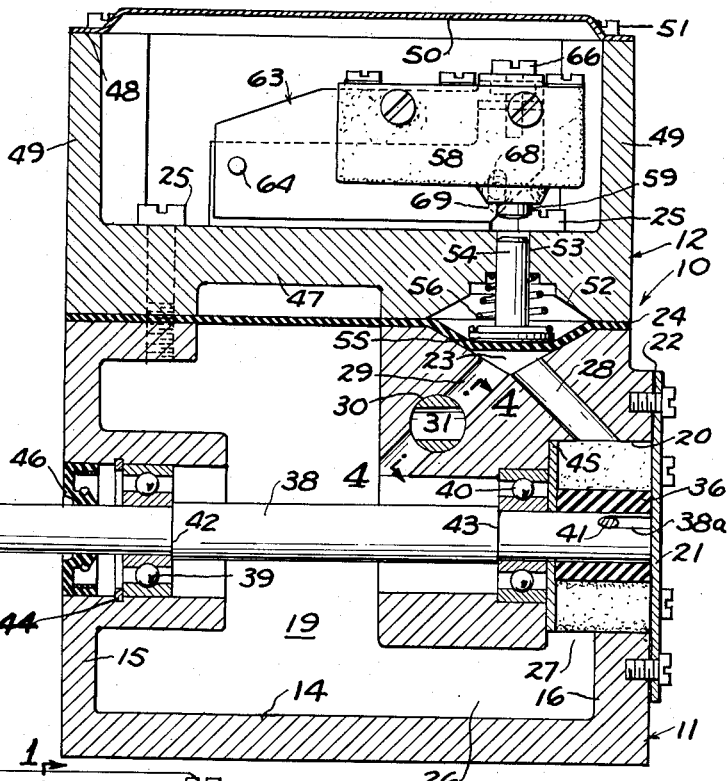
FIG. 1
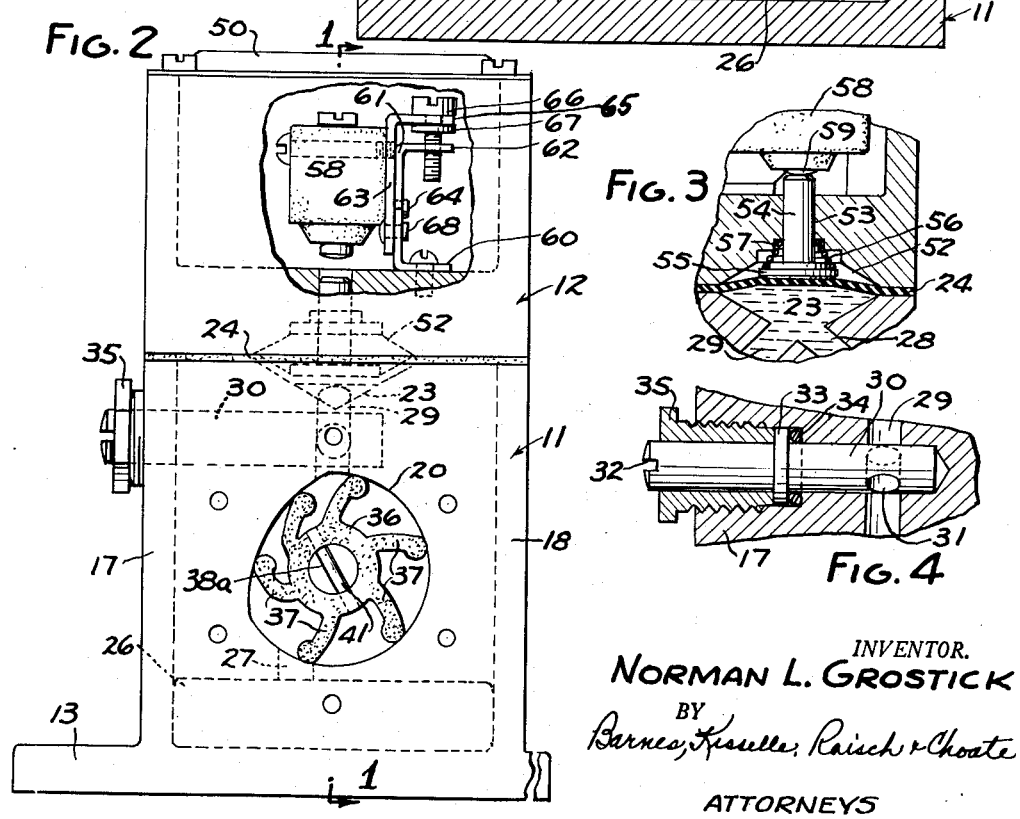
FIG. 2
FIG. 3
FIG. 4
INVENTOR.
NORMAN L. GROSTICK
BY
Barnes, Kisselle, Raisch & Choate
ATTORNEYS July 3, 1962 N. L. GROSTICK 3,042,767
MOTION INDICATOR
Filed July 14, 1958 2 Sheets-Sheet 2
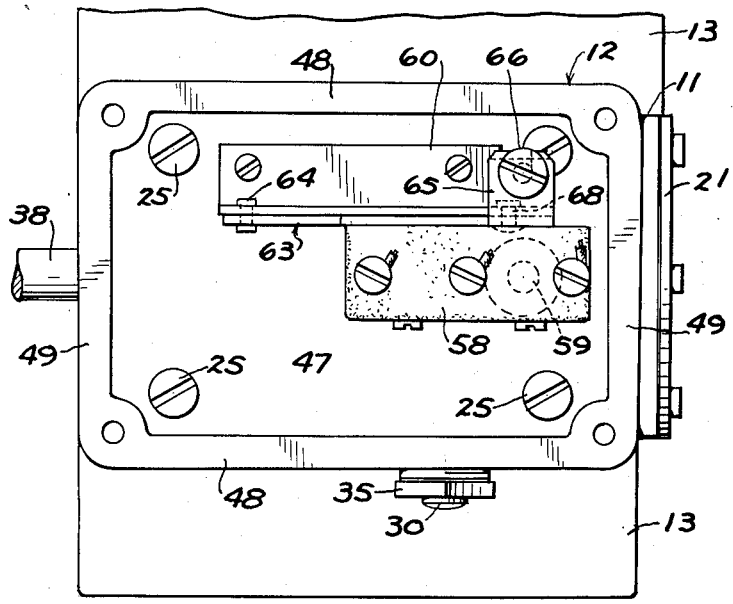
FIG. 5
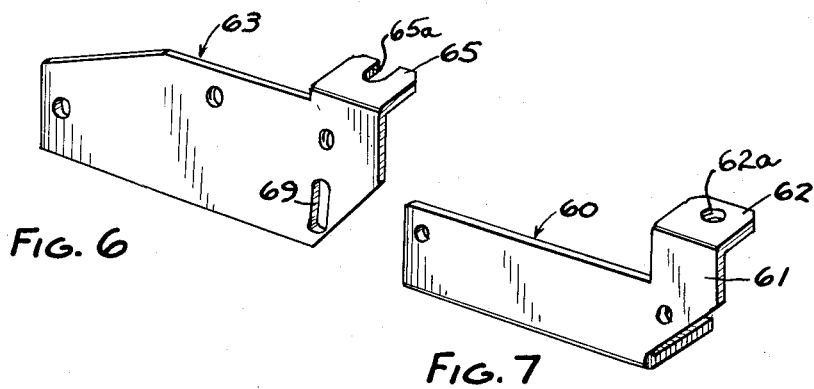
FIG. 6
FIG. 7
INVENTOR.
NORMAN L. GROSTICK
BY
ATTORNEYS

United States Patent Office 3,042,767
Patented July 3, 1962

3,042,767
MOTION INDICATOR
Norman L. Grostick, Lexington, Mich., assignor to The Bin-Dicator Company, Detroit, Mich., a corporation of Michigan
Filed July 14, 1958, Ser. No. 748,402
17 Claims. (Cl. 200—81)

This invention relates to a sensing device and more particularly to a motion indicator for indicating the change in speed of a conveyor or other moving part and particularly for indicating when the speed of such conveyor or moving part falls below a predetermined value.

It is an object of this invention to provide such a motion indicator which will effectively indicate when the speed of a moving part falls below a predetermined value; which can be easily adjusted; which is compact; which can be manufactured at low cost; and which is easy to maintain.

Basically, the motion indicator for indicating the change in speed of a moving part comprises a housing which has a hydraulic fluid reservoir, a pump cavity spaced from the reservoir and a pressure chamber spaced from the reservoir and the pump cavity. An impeller is rotatably mounted in the pump cavity and the shaft on which the impeller is mounted projects out of the housing and is adapted to be operatively connected to the moving part of which the change in speed is to be indicated. The housing includes an inlet passageway from the reservoir to the pump cavity, an outlet passageway from the pump cavity to the pressure chamber and an exhaust passageway from the pressure chamber to the reservoir. Valve means are provided in the exhaust passageway for variably restricting the exhaust passageway. A flexible diaphragm is mounted on the housing and forms a pressure responsive flexible wall adjacent the pressure chamber of the housing while signal means are mounted externally of the pressure chamber so that they are actuated by movement of the diaphragm in response to a variation in speed of the moving part.

In the drawings:

FIG. 1 is a sectional view taken along the line 1—1 in FIG. 2.

FIG. 2 is an end elevational view of the motion indicator, parts being removed and parts being broken away.

FIG. 3 is a fragmentary sectional view of a portion of the indicator shown in FIG. 1, showing the parts in a different operative position.

FIG. 4 is a fragmentary sectional view taken along the line 4—4 in FIG. 1.

FIG. 5 is a plan view of the motion indicator with the cover plate removed.

FIG. 6 is a perspective view of a part of the indicator.

FIG. 7 is a perspective view of another part of the indicator.

Referring to the drawings, the motion indicator comprises a housing 10 including a base section 11 and a cover section 12. Base section 11 includes a mounting flange 13 whereby it can be easily mounted.

Base section 11 is generally rectangular and comprises a bottom wall 14, end walls 15, 16 and sides walls 17, 18, thereby defining a reservoir 19. The upper end of base section 11 is open and in communication with reservoir 19. End wall 16 of base section 11 is formed with a pump cavity 20 in the outer surface thereof. The open end of cavity 20 is closed by a cover plate 21. A gasket 22 of suitable material such as neoprene rubber is provided between cover plate 20 and the outer surface of end wall 16 to form a liquid-tight seal. The upper end of end wall 16 of base section 11 is formed with a frusto-conical pressure chamber 23. A flexible diaphragm 24 of suitable material such as rubber-impregnated cloth is placed over the upper end of base section 11 and covers the open ends of reservoir 19 and pressure chamber 23. Cover section 12 is held in position over the base section by screws 25, thereby maintaining diaphragm 24 in sealing relationship.

Base section 11 has an inlet passageway 26 formed therein in the lower end of end wall 16 providing communication between reservoir 19 and pump cavity 20. As shown in FIG. 2, inlet passageway 26 extends across substantially the entire width of base section 11 and communicates with pump cavity 20 through a short connecting portion 27 of less width. Base section 11 is also formed with an outlet passageway 28 extending at an angle upwardly and inwardly from pump cavity 20 to pressure chamber 23. Base section 11 is further formed with an exhaust passageway 29 extending at an angle downwardly and inwardly from pressure chamber 23 to reservoir 19. A cylindrical valve member 30 is provided in exhaust passageway 29 to control the size of the opening of the passageway at that point thereby restricting the rate of flow of fluid through the exhaust passageway.

As shown in FIG. 4, valve member 30 has a diametral opening 31 therein. Valve member 30 extends through side wall 17 of base section 11 and has the outer end thereof formed with a slot 32 so that it can be easily rotated by a screw driver. Valve member 30 is locked in position by a construction which includes a radial flange 33 on the valve member 30. O ring 34 is positioned against a shoulder formed by a counterbore in the side wall 17 and is engaged by flange 33 to provide a hydraulic seal. A locking sleeve 35 having external threads is threaded into the counterbore and acts against flange 33 to lock valve member 30 in position.

As shown in FIGS. 1 and 2, an impeller 36 of synthetic rubber such as neoprene having flexible vanes 37 is rotatably mounted in pump cavity 20. Cavity 20 has an eccentric shape such that rotation of impeller 36 draws hydraulic fluid through outlet passageway 28, pressure chamber 23 and exhaust passageway 29 back to reservoir 19.

A drive shaft 38 is rotatably mounted in end walls 15, 16 by ball bearings 39, 40. Impeller 36 is fixed on one end of shaft 38 by a metal pin 41 on the impeller extending through a bifurcation 38a in the end of shaft 38. Shaft 38 is prevented from axial movement by shoulders 42, 43 which abut against the inner races of ball bearings 39, 40 and lock ring 44 engaging the outer race of ball bearing 39. A back plate 45 is interposed between bearing 40 and impeller 36. An oil seal 46 is located at the other end of shaft 38 outside of bearing 39 to seal the opening between the shaft 38 and housing 15 and thereby prevent the fluid in chamber 19 from escaping.

Cover section 12 comprises a bottom wall 47, side walls 48 and end walls 49. The upper end of cover section 12 is closed by a cover plate 50 held in position by screws 51. Cover section 12 is formed with a frusto-conical cavity 52 overlying the pressure chamber 23 and a vertical opening 53 extending through the bottom wall 47 at the center of cavity 52. A plunger 54 is mounted for vertical reciprocating movement in opening 53. The lower end of plunger 54 is enlarged and flattened as at 55 and is caused to yieldingly engage the diaphragm and urge it downwardly against the walls of pressure chamber 23 by a helical spring 56 interposed between the head 55 of plunger 54 and a shoulder 57 at the upper end of cavity 52. Helical spring 56 is preferably of the type which has a progressively increasing radius in the several coils thereof. A microswitch 58 is adjustably mounted above plunger 54 with the actuating button 59 thereof in general alignment with plunger 54.

Referring to FIGS. 2, 5, 6 and 7, the means for adjustably supporting switch 58 comprises a bracket 60 mounted on bottom wall 47 of cover section 12 and having a flat upstanding portion 61 and a horizontal flange 62. A support plate 63 is pivoted to flat portion 61 by a rivet 64. Plate 63 includes a horizontal flange 65 which overlies flange 62 of bracket 60. The switch 58 is mounted on support plate 63 with the axis of the button 59 aligned with the axis of plunger 54. A screw 66 having an annular shoulder 67 spaced from the head thereof is journalled in flange 65 of support plate 63 by insertion into a slot 65a in flange 65. Screw 66 is threaded into an opening 62a in flange 62 of bracket 60 so that rotation of screw 66 will cause the support plate 63 to pivot toward and away from plunger 54 and diaphragm 24 thereby adjusting the position of microswitch 58 relative thereto.

The pivotal movement of support plate 63 is limited by a rivet 68 on flat portion 61 of bracket 60 which extends into an arcuate slot 69 in plate 63.

In use, a pulley 70 may be provided on shaft 38 and connected by suitable drive means to the conveyor or other moving part, the speed of which is to be indicated. When the conveyor is running, hydraulic fluid will be caused to flow by the action of impeller 36 through inlet passageway 26, outlet passageway 28, pressure chamber 23 and exhaust passageway 29. When the speed of the conveyor is above the desired minimum for which the indicator is set, the pressure developed in pressure chamber 23 by impeller 21 and valve 30 is sufficient to cause the portion of diaphragm 24 which overlies pressure chamber 23 to move upwardly against the action of spring 56 to the position shown in FIG. 3 and thereby actuate button 59 of switch 58.

When the speed of the conveyor drops to a value below the minimum for which the indicator is set, spring 56 will overcome the fluid pressure developed in chamber 23 by impeller 21 and valve 30 and move the plunger downwardly out of engagement with button 59. Switch 58 will then energize a signal means or other device which indicates that the moving part is operating at a speed less than that desired. Alternatively, switch 58 may be designed to energize controls which, in turn, would speed up the moving part.

By rotating valve member 30, the size of exhaust passageway 29 at the point of the valve may be changed. If valve 30 is rotated to produce a greater restriction of passageway 29, a lower speed of rotation of shaft 38 and impeller 36 will be required to produce sufficient pressure in the chamber 23 to move diaphragm 24 and plunger 54 upwardly and actuate the button 59 on microswitch 58. If the valve 30 is moved to restrict passageway 29 to a lesser degree, a greater speed of rotation of shaft 38 and impeller 36 will be required to produce sufficient pressure in pressure chamber 23 to actuate switch 58. Thus, valve 30 may be used to set the motion indicator for the desired controlled speed of the device which is being indicated. If the desired minimum speed to be indicated is low, valve 30 is adjusted to produce substantial restriction in passageway 29, whereas, if the desired minimum speed is relatively high, valve 30 is adjusted to produce relatively little restriction in passageway 29.

The adjustment of switch 58 toward and away from plunger 54 controls the sensitivity of the motion indicator. If switch 58 is moved toward the plunger, a lesser movement of plunger 54 is required to actuate the switch and therefore the switch will be more sensitive to a pressure change in pressure chamber 23. If switch 58 is moved away from the plunger, a greater movement of plunger 54 will be required to actuate the switch; and therefore the motion indicator will be less sensitive to a change in pressure in chamber 23.

It can thus be seen that I have provided a motion indicator that will effectively indicate when the speed of a moving part such as a conveyor falls below a predetermined value. Moreover, the motion indicator can be easily adjusted. The motion indicator is compact. The bases of section 11 and cover section 12 are formed as relatively simple castings that can be economically machined. The unit is also designed so that it can be serviced very readily. Plate 21 may be removed to provide easy access to impeller 36 in the event of damage to the impeller. The impeller may be easily removed merely by moving it axially off the end of shaft 38.

It can be appreciated that the motion indicator may be used to sense when the maximum speed of a conveyor or other moving part has been reached.

I claim:

1. A motion indicator for indicating the change in speed of a moving part which comprises a housing having a hydraulic fluid reservoir, a pump cavity spaced from the reservoir and a pressure chamber spaced from the reservoir and the pump cavity, an impeller rotatably mounted in said pump cavity; a shaft on which said impeller is mounted, means for rotatably mounting said shaft in said housing, said shaft having one end projecting out of said housing and having means thereon adapted to be operatively connected to said moving part, means within said housing defining an inlet passageway from said reservoir to said pump cavity, means within said housing defining an outlet passageway from said pump cavity to said pressure chamber, means within said housing defining a separate exhaust passageway from said pressure chamber to said reservoir, means positioned in said exhaust passageway for variably restricting said exhaust passageway, a flexible diaphragm mounted in said housing and forming a pressure-responsive flexible wall of said pressure chamber, and signalling means adjacent said diaphragm and externally of said pressure chamber adapted to be actuated by movement of said diaphragm.

2. A motion indicator for indicating the change in speed of a moving part which comprises a housing having a base section and a cover section, said base section including a reservoir for hydraulic fluid, said base section also including a pressure chamber at the upper end thereof, a flexible diaphragm positioned generally horizontally over the upper end of said base section and closing the upper end of said pressure chamber, means for mounting said cover section on said base section and over said diaphragm to provide a liquid-tight seal of the upper end of said base section, said base section also including a pump cavity, an impeller rotatably mounted in said cavity, a shaft on which said impeller is fixed, means for rotatably mounting said shaft in said base section, said base section including an inlet passageway extending from said reservoir to said pump cavity, an outlet passageway extending from said pump cavity to said pressure chamber, and a separate exhaust passageway extending from said pressure chamber to said reservoir, means in said exhaust passageway for variably restricting said exhaust passageway, and signalling means mounted in said cover section adjacent the portion of said diaphragm which overlies said pressure chamber and adapted to be actuated by movement of said diaphragm.

3. The combination set forth in claim 2 wherein said impeller comprises a hub and a plurality of flexible vanes extending radially from the hub.

4. The combination set forth in claim 2 wherein said signalling means includes a plunger mounted for vertical reciprocating movement adjacent said pressure chamber, means for yieldingly urging said plunger toward said diaphragm, and a switch mounted on said cover section adjacent the upper end of said plunger in position to be acted upon by movement of said plunger.

5. A motion indicator for indicating the change in speed of a moving part which comprises a housing having a base section and a cover section, said base section being generally rectangular in section and comprising a bottom wall, side walls and end walls defining a reservoir for hydraulic fluid, one of said end walls having a pump cavity in the outer surface thereof, a plate closing said cavity, an impeller having a plurality of flexible vanes rotatably mounted in said cavity, a shaft, means rotatably mounting said shaft in substantially horizontal position in said base section, said impeller being fixed to one end of said shaft, the other end of said shaft projecting through the other end wall of said base section, said base section having a pressure chamber in the upper end of said one end wall above said pump cavity and including an inlet passageway adjacent the lower end of said one end wall extending from said reservoir to said pump cavity, an outlet passageway in said one end wall extending upwardly from said pump cavity to said pressure chamber and a separate exhaust passageway in said one end wall extending downwardly from said pressure chamber to said reservoir, means in said exhaust passageway for restricting the size of said exhaust passageway, a flexible diaphragm positioned generally horizontally over the upper end of said pressure chamber, means for mounting said cover section on said base section and thereby holding said diaphragm in sealing engagement with the upper end of said base section, and means mounted on said cover section adjacent said pressure chamber and adapted to be actuated by movement of said diaphragm.

6. The combination set forth in claim 5 wherein said means in said exhaust passageway comprises a cylindrical valve member rotatably mounted in said passageway with its axis intersecting the axis of said passageway, said member having a diametrally extending opening therethrough, whereby upon rotation of said member said opening may be moved into and out of alignment with said passageway.

7. The combination set forth in claim 6 wherein a portion of said valve member extends through a side wall of said base section, and including means for locking said valve member against rotation.

8. The combination set forth in claim 7 wherein said means for locking said valve member comprises a radially extending flange on said valve member, a gasket interposed between said flange and a portion of said base section, and a locking sleeve threaded into said base section and engaging said flange to urge said flange against said gasket.

9. The combination set forth in claim 5 wherein said cover section comprises a bottom wall, side walls and end walls, a cavity in the lower surface of said bottom wall adjacent said diaphragm, said bottom wall having an opening therethrough in overlying relationship to said diaphragm thereby providing communication between the cavity in said cover section and the area overlying the bottom wall of said cover section, a cover plate closing the upper end of said cover section, said means adapted to be actuated by movement of said diaphragm comprising a plunger mounted for reciprocating movement in said opening, said plunger having an enlarged lower end, a helical spring extending between a portion of said bottom wall and said enlarged head and yieldingly urging said plunger downwardly, and a switch mounted in said cover section, said switch having the operating portion thereof in overlying relationship to the upper end of said plunger.

10. The combination set forth in claim 9 including means for adjusting the position of the switch to move the operating portion thereof toward and away from the upper end of said plunger.

11. In a sensing device which includes a housing and a diaphragm on the housing movable in response to differential pressure on opposite sides thereof, a switch adjacent the other surface of the diaphragm and adapted to be actuated by movement of the diaphragm, means for mounting and adjusting the position of said switch toward and away from said diaphragm which comprises a support member pivotally mounted on said housing, said switch being fastened to said support member, means for moving said support member toward and away from said diaphragm, and means independent of said latter means for limiting the movement of said support member toward and away from said diaphragm.

12. In a sensing device which includes a housing and a diaphragm on the housing movable in response to differential pressure on opposite sides thereof, a switch adjacent the other surface of the diaphragm and adapted to be actuated by movement of the diaphragm, means for mounting and adjusting the position of said switch toward and away from said diaphragm which comprises a bracket member mounted on said housing, a support member pivoted on said bracket member, said switch being fastened to said support member, and means acting between said support member and said bracket member for moving said support member toward and away from said diaphragm to adjust the position of said switch relative to said diaphragm.

13. The combination set forth in claim 12 including means independent of said latter means for limiting the pivotal movement of said support member toward and away from said diaphragm.

14. The combination set forth in claim 13 wherein said means for limiting the movement of said support member comprises a slot in one of said support member and bracket member, and means on the other of said support member and bracket member projecting into said slot.

15. The combination set forth in claim 12 wherein said means acting between said bracket and support member for moving said support member toward and away from said diaphragm comprises a screw journalled in one of said support member and bracket member and threaded into the other of said support member and bracket member.

16. In a sensing device which includes a housing and a diaphragm on the housing movable in response to differential pressure on opposite sides thereof, a switch adjacent the other surface of the diaphragm and adapted to be actuated by movement of the diaphragm, means for mounting and adjusting the position of said switch toward and away from said diaphragm which comprises a bracket mounted on said housing and having a flat upstanding portion and a horizontal flange on the upper end of the upstanding portion of said bracket, said switch being fixed to said support plate, said plate having a horizontal flange overlying the flange of said bracket, and a screw journalled in the flange of said plate and threaded into the flange of said bracket, the axis of said screw being generally perpendicular to the plane of said diaphragm, whereby rotation of said screw pivots said plate on said bracket toward and away from said diaphragm.

17. The combination set forth in claim 16 including a slot in said support plate and a pin on said bracket whereby the pivotal movement of said support plate relative to said bracket is limited.

References Cited in the file of this patent

UNITED STATES PATENTS

| | | |
|---|---|---|
| 1,219,723 | Gracey | Mar. 20, 1917 |
| 1,580,433 | Holdsworth | Apr. 13, 1926 |
| 2,086,264 | Gorschalki | July 6, 1937 |
| 2,369,397 | Kostenick | Feb. 13, 1945 |
| 2,392,262 | Ramsey | Jan. 1, 1946 |
| 2,527,353 | Christian | Oct. 24, 1950 |
| 2,789,176 | Mercier | Apr. 16, 1957 |

FOREIGN PATENTS

| | | |
|---|---|---|
| 563,348 | Germany | Nov. 3, 1932 |
| 775,882 | Great Britain | May 29, 1957 |